United States Patent
Huegel

(10) Patent No.: US 8,708,117 B2
(45) Date of Patent: Apr. 29, 2014

(54) DAMPER UNIT AND FORCE-TRANSMITTING DEVICE COMPRISING SUCH A DAMPER UNIT

(75) Inventor: Christian Huegel, Rheinau (DE)

(73) Assignee: Scaheffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/606,522

(22) Filed: Sep. 7, 2012

(65) Prior Publication Data

US 2012/0325609 A1 Dec. 27, 2012

Related U.S. Application Data

(63) Continuation of application No. PCT/DE2011/000158, filed on Feb. 17, 2011.

(30) Foreign Application Priority Data

Mar. 11, 2010 (DE) .................. 10 2010 011 108

(51) Int. Cl.
*F16H 45/02* (2006.01)
*F16F 15/134* (2006.01)
*F16D 3/14* (2006.01)

(52) U.S. Cl.
USPC ........ 192/3.29; 74/574.2; 192/213; 464/68.2; 464/68.8

(58) Field of Classification Search
USPC .......... 464/68.1, 68.2, 68.8; 74/574.2; 60/338
See application file for complete search history.

(56) References Cited

U.S. PATENT DOCUMENTS

| | | | |
|---|---|---|---|
| 6,224,487 B1 * | 5/2001 | Yuergens | 464/68.8 |
| 2009/0151344 A1 * | 6/2009 | Degler et al. | 60/338 |
| 2010/0122605 A1 * | 5/2010 | Maienschein et al. | 74/574.2 |
| 2010/0133063 A1 | 6/2010 | Degler | |
| 2010/0236228 A1 | 9/2010 | Degler et al. | |
| 2011/0099992 A1 | 5/2011 | Magerkurth et al. | |

FOREIGN PATENT DOCUMENTS

| | | |
|---|---|---|
| DE | 19831160 | 1/2000 |
| DE | 10236752 | 2/2004 |
| DE | 102006028556 | 1/2007 |
| DE | 102008034557 | 2/2009 |
| DE | 102008057648 | 6/2009 |
| DE | 102009024743 | 1/2010 |

\* cited by examiner

*Primary Examiner* — Rodney Bonck
(74) *Attorney, Agent, or Firm* — Simpson & Simpson, PLLC

(57) ABSTRACT

A damper unit having at least two series-connected damper units arranged offset from each other in a radial direction, each including two damper parts that are coupled to each other by means of spring units and a speed-adaptive absorber which is at least indirectly coupled to the connection between the two dampers, wherein the speed-adaptive absorber is arranged between the spring units of both dampers in a radial direction.

9 Claims, 2 Drawing Sheets

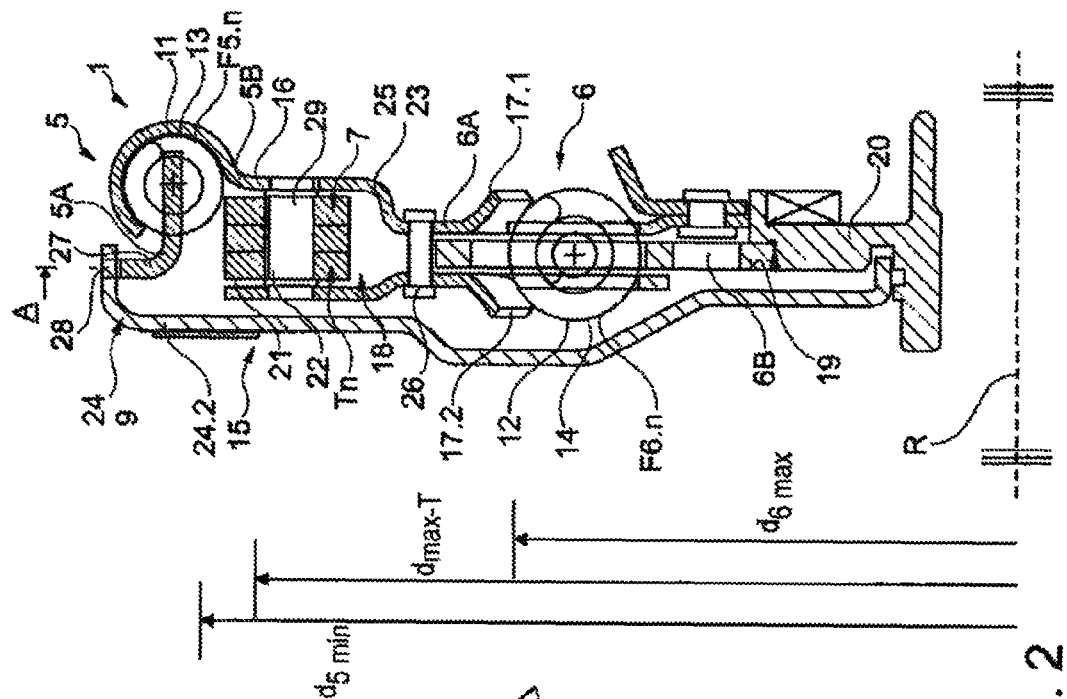
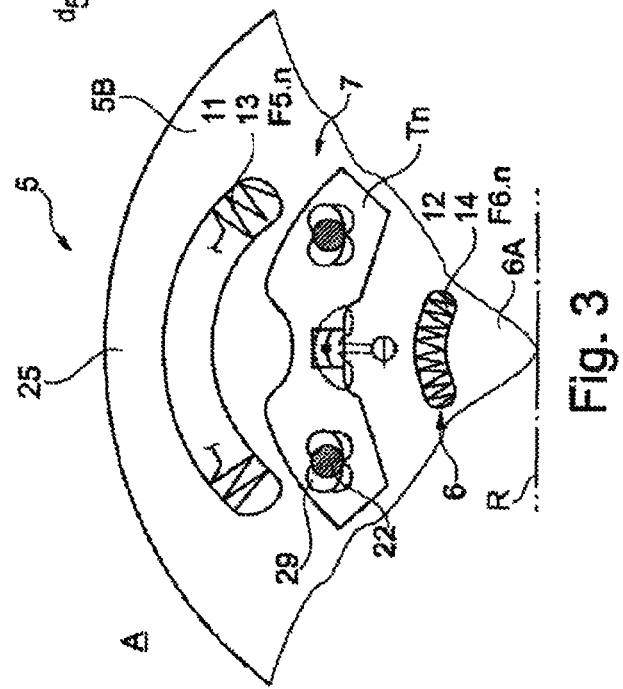

DAMPER UNIT AND FORCE-TRANSMITTING DEVICE COMPRISING SUCH A DAMPER UNIT

CROSS-REFERENCE TO RELATED APPLICATIONS

This application is filed under 35 U.S.C. 111(a) as a continuation of International Patent Application No. PCT/DE2011/000158 filed Feb. 17, 2011 and claiming priority of German Patent Application No. 10 2010 011 108.2 filed Mar. 11, 2010, which applications are incorporated herein by reference in their entireties.

FIELD OF THE INVENTION

The invention relates to a damper unit comprising at least two series-connected dampers which are arranged offset in relation to each other in a radial direction, each comprising at least two coaxially arranged damper parts which are coupled together by spring units and are limitedly rotatable relative to each other in a peripheral direction, and a speed-adaptive absorber that is coupled to the connection between the two dampers. The invention also relates to a force-transmitting device comprising a damper unit.

BACKGROUND OF THE INVENTION

In drivetrains, comprising a driving engine and at least one power takeoff, where an internal combustion engine is used as the driving engine, damper units for damping vibrations are used with a wide range of designs depending on the arising vibration conditions. Damper units function as elastic couplings that comprise at least two damper parts arranged coaxially in relation to each other, are restrictedly rotatable relative to each other in the peripheral direction, and are coupled to each other by means for transmitting torque and coupling damping.

If, in addition to the rotation of the driveshaft, torsional vibrations arise at a frequency that changes with the speed of the shaft, additional or alternative absorber arrangements are used to avoid the resulting irregular rotations. These are additional masses that are coupled by means of a spring system to the vibration system. The functioning of an absorber is based on the principle that the primary mass remains at rest at a certain excitation frequency, whereas the individual additional masses experience forced vibration. Since the excitation frequency changes with the speed of the driving engine, whereas the intrinsic frequency of the absorber remains constant, the absorption effect only occurs at certain speeds. Such an absorber is, for example, already known from the document DE 102 36 752 A1.

To absorb the effect of excitation over a broad, preferably the entire, speed range of the driving engine, speed-adaptive absorbers are provided in drivetrains, according to DE 198 31 160 A1, that can absorb torsional vibrations over a wide speed range, preferably over the entire speed range, of the driving engine by designing and arranging them so that their intrinsic frequency is proportional to the speed.

Absorbers function according to the principle of a centrifugal pendulum-type absorber in a centrifugal force field. These comprise an inertial mass support device and inertial masses oscillating thereupon about a rotary axis. When a rotary movement is introduced, the inertial masses seek to circle about the axis at a maximum distance. The torsional vibrations cause the inertial masses to execute an oscillating relative movement. Different systems are known in which the inertial masses move in a purely translational manner on a circular path of movement relative to the axis along which torque is introduced, or the path of movement has a radius of curvature that changes, at least in sections, with the increasing deflection of the inertial mass from the central position.

An arrangement of a damper unit as well as an absorber in the form of a centrifugal pendulum-type absorber device in a force-transmitting device comprising a shiftable clutch device is disclosed in the document DE 10 2006 028 556 A1. The centrifugal pendulum-type absorber device has a plurality of inertial masses that are articulated to the inertial mass support and can move relative thereto with the assistance of rollers therein.

A force-transmitting device is previously known from document DE 10 2008 057 648 A1 for transmitting power between a driving engine and a power takeoff comprising a generic damper unit that acts over the entire operating range of a driving engine and had at least two series-connectable dampers and one speed-adaptive absorber, wherein the speed-adaptive absorber is inserted between the dampers viewed at least in one direction of the flow of force through the force-transmitting device. The speed-adaptive absorber can be designed as a separately preinstallable unit. On the other hand, it is conceivable to design the speed-adaptive absorber as a component of one of the connecting elements, wherein the respective connecting element can be formed by an element of a damper of the damper unit. With such designs, the introduction of irregular rotation into the drivetrain can be reduced or avoided, especially in a direction of the flow of force that is preferably always used in the main zone of work.

BRIEF SUMMARY OF THE INVENTION

A damper unit designed according to the invention comprising at least two series-connected dampers which are arranged offset in relation to each other in a radial direction, each comprising at least two coaxially arranged damper parts which are coupled together by spring units and are limitedly rotatable relative to each other in a peripheral direction, and a speed adaptive absorber that is coupled to the connection between the two dampers is characterized in that the speed-adaptive damper is arranged in a radial direction between the spring units of the two dampers and is mounted on at least one of the damper parts coupled to each other of the series-connected dampers, or on the connection between them.

A speed-adaptive damper according to the invention is understood to be a device that does not transmit torque hut is instead suitable to absorb excitation over a very wide range, preferably the entire speed range, of a driven engine that can at least be indirectly coupled thereto. The intrinsic frequency of a speed-adaptive absorber is proportional to the speed, especially the speed of the excited engine.

The arrangement according to the invention of the speed-adaptive absorber allows a universal damper unit to be designed in a particularly installation-space-saving manner, especially when used in force-transmitting devices, in addition to reducing and possibly completely avoiding the introduction of rotational irregularities in a drivetrain by combining the individual damper with a speed-adaptive absorber. Limiting the installation space of the arrangement for the speed-adaptive absorber in a radial direction according to the invention simultaneously allows the absorber to be arranged close to the individual dampers in an axial direction. The damper unit according to the invention is suitable in a particularly advantageous manner for use in force-transmitting devices in which the shiftable clutch device and the damper radially to the outside, are arranged in a radial direction within a common radial extended area.

According to an advantageous and installation-space-saving embodiment of the damper unit, the speed-adaptive absorber is arranged within the axial extension area of at least one of the two dampers within the claimed radial area. In this case, the speed-adaptive absorber does not have any influence on the axial installation length of the damper unit.

In another advantageous embodiment, both series-connected dampers are arranged in relation to each other without any offset in an axial direction, wherein the three functional elements, the two dampers and the absorber, are arranged within a common axial extension area so as to provide a particularly compact construction of the damper unit in an axial direction.

To reduce the number of required components and simplify installation, at least one component of one of the damper parts to be connected or that are connected to each other of the series-connected dampers are formed by an integral component, wherein the speed-adaptive absorber is mounted on this integral component. Additional connecting means for realizing the in-line connection of the dampers are eliminated along with failure-prone connecting sites requiring a great deal of installation space to realize the in-line arrangement and also couple and support the speed-adaptive absorber. In addition to simplifying installation, such an arrangement is characterized by high availability.

In a particularly advantageous embodiment, the integral component is designed as a shaped sheet metal part and forms either a cover plate, or a middle part of the respective damper part of the series-connected dampers. Such damper components are easy to manufacture by cutting and shaping methods and can also be made with more complex shapes. Furthermore, additional functions, especially cutouts and guides for the spring units and/or limits to the angle of rotation, can be optimally integrated therein by corresponding sheet metal processing methods or additional joining operations.

Different possible embodiments of the speed-adaptive absorber are conceivable. in one advantageous embodiment, it is formed as a centrifugal pendulum-type absorber device comprising an inertial mass support device and at least two inertial masses mounted thereupon in an oscillating manner, wherein the damper parts to be connected to each other, especially one of them or the connection itself, is designed as an inertial mass support device. This embodiment is characterized by a high concentration of functions and a low number of components and requires minimum installation space in an axial direction.

An alternate, separate embodiment of the speed-adaptive absorber can be connected by means of fastening elements to the connecting elements that are already available by placing the area for connecting the speed-adaptive absorber at the fastening area between the connecting elements, and the fastening elements that are already required are preferably used to couple the absorber. If the speed-adaptive absorber is pre-installed as a separate component, it can be combined with standardized damper components without them having to be modified. Moreover, exchange is easy. The speed-adaptive absorber can also be kept in stock preinstalled.

There are numerous possibilities for the design of the individual dampers. The damper unit is at least designed as a sequential damper in one direction of the flow force. The individual dampers of the damper arrangement can also be designed as individual dampers or as sequential or parallel dampers. The individually realizable damping stages can be further influenced with regard to the damping characteristics that are achievable with them, and possibly optimized to certain requirements.

There are numerous possibilities for arranging the dampers. However, these possibilities are dependent on the specific design of the individual dampers. A distinction is drawn between a functional and spatial arrangement. In spatial terms, especially viewed in an axial direction between the input and output of the force-transmitting device, the spatial arrangement of the dampers in relation to each other within the damper arrangement can be offset in an axial direction or without an offset.

In one advantageous development, the means for non-rotatably connecting at least one damper simultaneously form an end stop for the speed-adaptive absorber as well as means for limiting the angle of rotation.

The damper unit according to the invention is preferably used in force-transmitting devices that can have different designs. One particularly advantageous embodiment is a combined startup unit that can also be used as a multifunctional unit. This comprises a hydrodynamic component having at least one primary wheel functioning as a pump Wheel and a secondary wheel functioning as a turbine wheel that form a working area together, wherein the turbine wheel is connected at least indirectly in a non-rotatable manner to the output of the force-transmitting device and is coupled by at least one damper of the damper arrangement, wherein the speed-adaptive absorber is connected at least indirectly in a non-rotatable manner to one of the damper parts coupled to each other to provide the in-line connection. The expression "at least indirectly" means that the coupling can be either direct and free from intermediate additional transmission elements, or also indirect by coupling, for example, to a connecting element. The force-transmitting device according to the invention is characterized by a damper unit designed according to the invention that is arranged and designed such that both dampers follow at least the shiftable clutch device viewed along the flow of force from the input to the output.

This solution, especially in a direction of the flow of force that is preferably always used in the main zone of work, can reduce or eliminate the introduction of irregular rotation into the drivetrain. In addition, the overall damping system can be better adapted to the torsional vibrations to be absorbed without significant, additional modifications to the individual dampers.

In one development, the hydrodynamic component is coupled to the damper unit such that at least one damper and the speed-adaptive absorber are downstream therefrom in the flow of force. This arrangement ensures that the speed-adaptive absorber is effective in all operating conditions. This coupling occurs when one of the dampers is used, as an absorber at the radially inside damper in the connecting area to the radially outside damper. If it is desired to also use the radially outside damper in its function as an elastic coupling, the connection to the radially outside damper comes before the absorber in the flow of force.

According to an advantageous embodiment, the damper unit is connected to the shiftable clutch device and/or the hydrodynamic component by means of a non-rotating connection with axial length compensation which can significantly simplify production and assembly due to the potential tolerance compensation that this enables.

The object of the invention is to develop a generic damper unit that is characterized by requiring less installation space in a radial and axial direction and can thereby be optimally placed within the small available installation space.

BRIEF DESCRIPTION OF THE DRAWINGS

The solution according to the invention is described in the following in greater detail with reference to the figures. In particular, the following is shown:

FIG. 2 is an axial section of a particularly advantageous embodiment of a damper unit with a speed-adaptive absorber; and, FIG. 3 is a simplified representation in a section of view A of mounting the speed-adaptive absorber on a cover disk assigned to one of the two dampers.

DETAILED DESCRIPTION OF THE INVENTION

Figure 1:
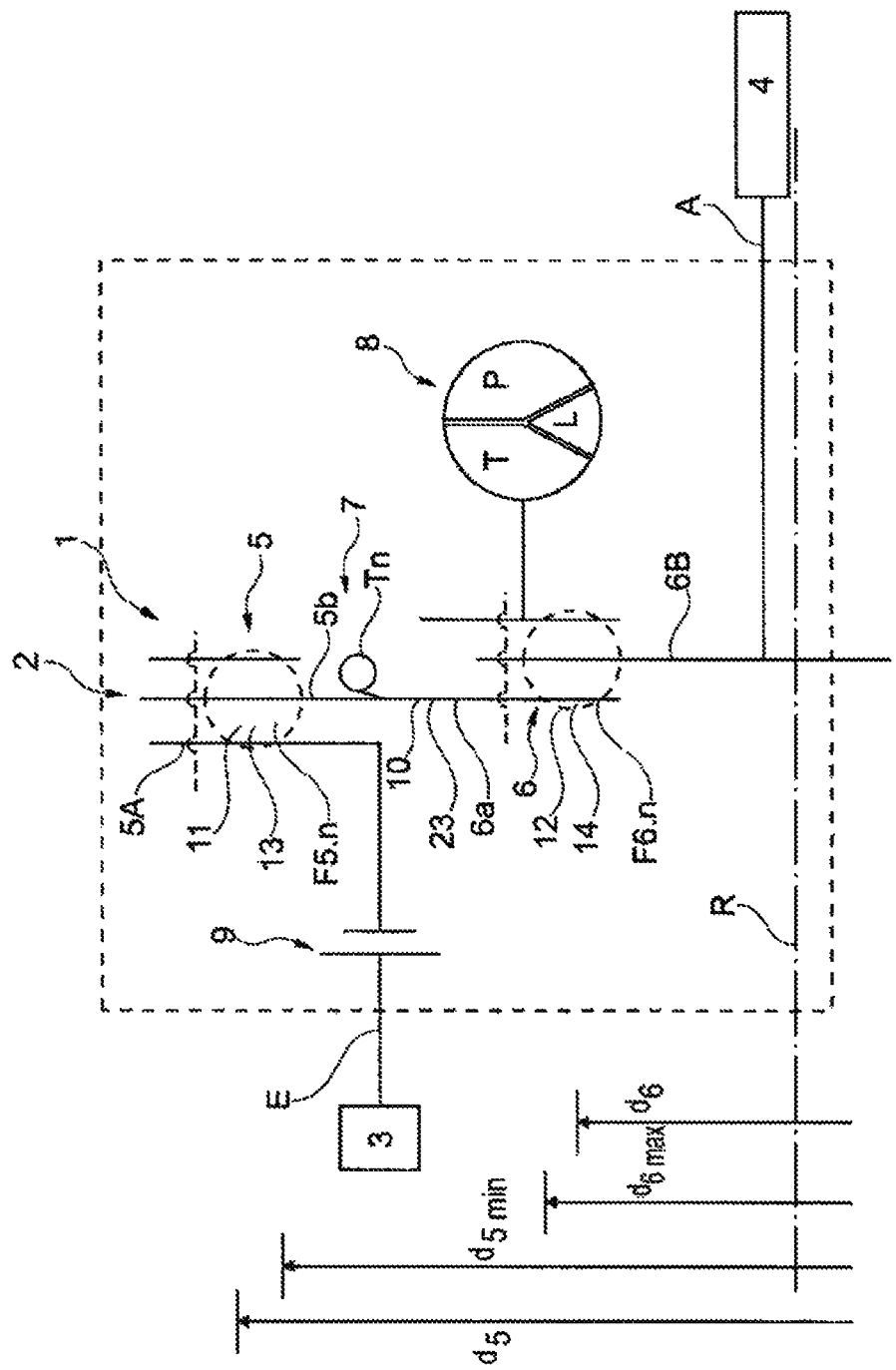
FIG. 1 is a schematic simplified view of the arrangement according to the invention of a speed-adaptive absorber.

FIG. 1 shows a schematically highly simplified representation of the construction of a damper unit 1 designed according to the invention in a force-transmitting device 2 for transmitting power in drivetrains, especially in drivetrains of motor vehicles. The force-transmitting device 2 serves to transmit power between a component 3 on the power input side, for example in the form of a driving engine that can be designed as an internal combustion engine, and at least one component 4 on the power takeoff side. The force-transmitting device 2 comprises an input E and at least one output A. The input E is at least indirectly connected to the power input side component 3, and the output A is at least indirectly connected to at least one power output side component 4. The damper unit 1 is arranged between the input E and output A and can rotate about a rotary axis R. This comprises at least two series-connectable dampers 5 and 6 as well as one speed-adaptive absorber 7. A speed-adaptive absorber 7 is understood to be a device to absorb irregularities in rotation that, however, does not transmit power. In a particularly advantageous embodiment, the speed-adaptive absorber is formed by a centrifugal pendulum-type absorber device. Torsional vibrations can be absorbed over a wider range of speed, preferably the entire speed range of the driving engine, in that inertial masses T1 to Tn, in this case only represented as Tn, seek to circle around an axis of torque introduction at a maximum distance. The torque introduction axis coincides with the rotary axis R of the damper unit 1. The overlapping of the rotation with torsional vibrations causes an oscillating relative movement of the inertial masses T1 to Tn. The speed-adaptive absorber 7 is arranged between the two dampers 5 and 6, at least in one of the theoretically possible directions of the flow of force through the damper unit 1. In addition to the individual dampers 5 and 6 dampening vibrations, the speed-adaptive absorber 7 is effective at different frequencies.

There are numerous options for the specific structural design of the dampers 5 and $ of the damper unit 1 and their connection to the connecting parts or components in the force-transmitting device 2. Particularly in embodiments of the force-transmitting device 2 with a hydrodynamic component 8 having at least one pump wheel P and one turbine Wheel T, and in an embodiment as a hydrodynamic speed/torque converter having at least one guide wheel L and with a device 9 for at least partially bridging the hydrodynamic component 8 as well as series-connecting dampers 5 and 6, a distinction is drawn between embodiments in which the dampers 5 and 6 function as an elastic coupling, that is, torque is transmitted and damping occurs in both power branches, or at least power is transmitted via one of the components with series-connected dampers 5 and 6 that function as elastic couplings, power is transmitted via the other component, one of the dampers 5 or 6 acts as an elastic coupling, and the other damper 6 or 5 acts as an absorber. The latter variant is shown in the embodiment in FIG. 1. With this, force flows in one power branch, and the hydrodynamic component 8 is bridged by the device 9 via both dampers 5 the 6 with an intermediate speed-adaptive absorber 7. When power is transmitted via the hydrodynamic component 8 the damper 5 functions as an absorber. However, the absorber 7 acts in both power branches since it is coupled to the connection of both dampers 5 and 6.

The dampers 5 and 6 are arranged offset relative to each other in a radial direction. The arrangement in an axial direction viewed along the rotary axis R is at an offset in this case, for example, but it can also be without an offset. Each of the dampers 5 and 6 comprises at least two damper parts 5A and 5B or 6A and 6B that are arranged coaxial to each other and are limitedly rotatable relative to each other in a circumferential direction. The individual damper parts 5A, 5B or 6A and 68 of the individual dampers 5 and 6 are connected to each other by means 11 or 12 for transmitting torque, and means 13 or 14 for coupling damping. In a particularly advantageous embodiment, the functions of the means 11 and 13 for transmitting torque and coupling damping for the damper 5, and 12 and 14 for damper 6, are formed in a concentration of functions by the same functional components. These are spring units $F5.1$ to $F5.n$ for damper 5, and $F6.1$ to $F6.n$ for damper 6. The individual spring units $F5.1$ to $F5.n$ of damper 5 and $F6.1$ to $F6.n$ of damper 6 are arranged at a distance from each other in a circumferential direction, preferably on a common diameter, and their end sections alternately abut one of the damper parts 5A, 5B or 6A, 6B. This diameter is termed the effective diameter $d_5$ or $d_6$ that corresponds to the average diameter of the arrangement of the spring units $F5.1$ to $F5.n$ or $F6.1$ to $F6.n$. The radially outer damper is formed by damper 5 in this case. According to the invention, the speed-adaptive absorber 7 is arranged between the two dampers 5 and 6, viewed in a radial direction, especially the minimum diameter $d_5$ characterized in a radial direction by the spring units $F5.1$ to $F5.n$ and the maximum diameter $d_{6max}$ characterized in a radial direction by spring units $F6.1$ to $F6.n$. The speed-adaptive absorber 7 comprises inertial masses T1 to Tn that are arranged about the rotational or rotary axis R. The inertial masses T1 to Tn are borne on an inertial mass support device 10. The function of the inertial mass support device 10 for the inertial masses T1 to Tn is taken over by one of the damper parts 5B or 6A of the dampers 5 and 6 that are connected to a damper part 6A or 5B of the other damper 6 or 5, or that form a structural unit therewith, or by the connection 23 between the dampers 5, 6. The speed-adaptive absorber 7 can hence be integrated in the damper unit 1 in a space-saving mariner.

FIG. 2 portrays an axial section of a particularly advantageous embodiment of a damper unit 1 designed according to the invention. The damper unit 1 is designed as a serial damper comprising the two dampers 5 and 6 that are designed as single dampers and are arranged offset from each other in a radial direction. The first damper part 5A is at least indirectly non-rotatably connected to the power input side component 3. Portrayed here as an example is the output 24.2 of a shiftable clutch device 24 that functions as a device 9 for at least partially bridging the hydrodynamic component in force-transmitting devices 2 with a hydrodynamic component, and is formed by a piston element 15 in a concentration of functions in that the functions of the outer clutch disk and adjusting device for a shiftable clutch disk 24 are combined with each other. The radially outer damper 5 is arranged in a radial direction in the area in which the shiftable clutch device 24 is arranged. The damper part 5B is formed by a cover disk 16 that serves to guide the spring units F5.1 to F5.6 and is designed to at least partially enclose them in a circumferential direction viewed in an axial section. The damper part 511 is connected to the damper part 6A for the second damper 6 that corresponds to the radially inner damper in a radial direction and, in the portrayed instance, is designed as a structural unit in the form of an integral component in a particularly advantageous embodiment. The damper part $A in the portrayed instance is formed by two cover disks 17.1 and 17.2 that function as driver disks for the spring units F6.1 to F6.n. In the portrayed instance, the cover disk 17.1 is designed in the form of an integral component with the cover disk 16, preferably as a shaped sheet metal part 25. The shape is such that both dampers 5 and 6 and hence the spring units F5.1 to F5.n or F6.1 to F6.n are arranged slightly offset viewed in an axial direction. In this embodiment, a gap 18 is formed between the spring units F5.1 to F5.6 of the damper 5, and F6.1 to F6.n of the damper 6, in a radial direction that can be used for arranging the speed-adaptive absorber 7. The speed-adaptive absorber 7 can be arranged in an axial direction substantially in a plane with one of the dampers 5 or 6, in the portrayed case with the radially inner damper 6 in a particularly advantageous manner.

The damper part 6B is formed by a flange 19 that functions as a middle disk, and is arranged between the two cover disks 17.1 and 17.2 of the damper 6, and is at least indirectly non-rotatably connected to the output A of the force-transmitting device 2. In the portrayed case, the flange 19 is non-rotatably connected to a hub 20.

The speed-adaptive absorber 7 in the portrayed case is mounted both on damper part 5B and on damper part 6A, or the inertial mass support device 10 is at least formed by components of these damper parts 5B, 6A in an integral embodiment. It would also be conceivable to have a multipart design or separate design of the damper parts 5B and 6A and connect them in a non-rotatable manner, wherein the inertial masses T1 to Tn can be coupled to the individual damper parts 513 or 6A or to their connection 23. The advantage of the structural unit is the high concentration of functions and the elimination of a connecting site correspondingly designed for this purpose as well as additional connecting and fastening elements so that the space can be optimally used for arranging the speed-adaptive absorber 7.

The inertial mass support device 10 is designed as a shaped sheet metal part 25 made of a discoid sheet-metal part. Given the axially spaced arrangement of the cover disks 17.1 and 17.2 and their non-rotatable connection 26, the advantage of mounting the inertial masses T1 to Tn on the damper part 6A is that the individual inertial masses T1 to Tn are mounted evenly on both sides. The individual inertial masses T1 to Tn are arranged in this instance on a diameter of the arrangement that is characterized in that the outer circumference 21 of the inertial masses T1 to Tn in a deflected state defines a diameter that is identified as the maximum diameter $d_{max-T}$ and lies within the smallest extension diameter of the spring units F5.1 to F5.n characterized by the minimum radial diameter This prevents any restriction by the spring units F5.1 to F5.n when the inertial masses T1 to Tn are deflected, and the arrangement of the inertial masses T1 to Tn viewed in a radial direction is always within the minimum radial diameter $d_{5min}$ of the arrangement of the spring units F5.1 to F5.n.

The embodiment in FIG. 2 is a particularly advantageous design. The damper part 5A is designed as a flange 27 and is connected via axial disk teeth 28 to the power input side component in the form of the piston 15 forming the output 24.2 of the shiftable clutch device 24, whereby the arrangement of the damper component 1 in an axial direction can be varied by the axial length compensation generated thereby. The damper parts 5B and 6A form a structural unit in the form of a shaped sheet metal part 25 and function as an inertial mass support device 10, wherein both assume the guidance of the individual spring units F5.1 to F5.6 and F6.1 to F6.n of the individual dampers 5 and 6 in addition to bearing the inertial masses T1 to Tn. In a particularly advantageous embodiment, the damper part 6A is designed in two parts in the form of two cover disks 17.1 and 17.2 at a distance from each other in an axial direction, wherein the two cover disks 17.2 serve to bear the inertial masses T1 to Tn and guide the second damper 6.

The non-rotating connection 26 between the cover disk 17.1 functioning as a driver disk, and the cover disk 17.2 functioning as a counter disk is realized by spacing bolts or plates that simultaneously represent a stop for the centrifugal pendulum-type, absorber and the radially inner damper 6. The end stop of the speed-adaptive absorber 7 and the limitation of the rotational angle of the radially inner damper 6 are combined in a high concentration of functions.

Although not shown here, it would also be theoretically conceivable for the damper part 6B to be formed by a middle-disk-forming flange. In this case, however, the inertial masses T1 to Tn would only be arranged on one side of an inertial mass support device 10.

There are numerous possibilities for designing the speed-adaptive absorber 7. In an advantageous embodiment, it is designed as a centrifugal pendulum-type absorber device and comprises one, preferably several such inertial masses T1 to Tn arranged at a distance in a circumferential direction that are mounted on the inertial mass support device 10 so as to be movable relative thereto. The mounting 29 can, for example, oscillate by means of rollers 22. Under the influence of centrifugal force, the centrifugal masses T1 to Tn move to the outside at least in a radial direction; in addition, at least one centrifugal mass T1 to Tn can move back and forth relatively along a path of movement into a deflection position proceeding from a middle position in which the greatest distance is assumed between its center of gravity and the mid-axis corresponding to the rotational axis R of the damper unit, wherein the distance between the center of gravity of at least one inertial mass T1 to Tn changes relative to the middle position. In regard to other potential designs of speed-adaptive absorbers, reference is made by way of representation to the documents DE 10 2006 028 556 A1 and DE 198 31 160 A1. All the information in these documents regarding the design of the speed-adaptive vibration absorbers is hereby included in the present application.

Under the influence of centrifugal force, the inertial masses T1 to Tn seek to move along the largest radius relative to the axis of torque introduction. The overlapping of the rotation with torsional vibrations causes an oscillating relative movement of the inertial masses T1 to Tn. This also applies to restoration. There is no separate restoration force. The frequency of this oscillating movement is proportional to the speed; consequently, the torsional vibrations can be absorbed over a wide speed range at frequencies that are equally proportional to the speed at the power input side. An embodiment is known from the document DE 198 31 160 A1 in which the path of movement is further characterized, for example, by a radius of curvature that changes, at least in sections, as the inertial masses are increasingly deflected from the middle position.

An embodiment of such an absorber 7 is, for example, shown in FIG. 3 in a section from view A according to FIG. 2. This is an exemplary embodiment of the arrangement of the inertial masses T1 to Tn, their mounting and especially their oscillating mounting 29 on the inertial mass support device 10 and hence the damper part 6a or the structural unit consisting of the cover disks 16 and 17.2. One can discern the shape of an annular element in the form of a shaped sheet metal part 25 and the individual inertial masses, in this case Tn for example, arranged thereupon evenly distributed in the circumferential direction and mounted in an oscillating manner. These are held in a movable manner on the shaped sheet metal parts 25 with the assistance of sheathed step pins 30 and rollers 22.

The arrangement according to the invention is characterized in that the speed-adaptive absorber 7 acts both via the hydrodynamic component and the shiftable clutch device when embodied and integrated in a force-transmitting device 2 according to FIGS. 1 and 2 as power is transmitted.

REFERENCE NUMERALS

1 Damper unit
2 Force-transmitting device
3 Power input side component
4 Power output side component
5 Damper
5A Damper part
5B Damper part
6 Damper
6A First damper part
6B Second damper part
7 Speed-adaptive absorber
8 Hydrodynamic component
9 Device for at least partial bridging
10 Inertial mass support device
11 Means for torque transmission
12 Means for torque transmission
13 Means for damping coupling
14 Means for damping coupling
15 Piston element
16 Cover plate
17.1, 17.2 Cover plate
18 Gap
19 Flange part
20 Hub
21 Outer circumference of the inertial masses T1 to Tn when deflected
22 Rollers
23 Connection
24 Shiftable clutch device
24.2 Output part of the shiftable clutch divides
25 Shaped sheet metal part
26 Non-rotating connection
27 Flange
28 Disk teeth
29 Mounting
30 Step pin
$d_5$ Effective diameter of the damper 5
$d_6$ Effective diameter of the damper 6
$d_{max-T}$ Maximum diameter of the speed-adaptive absorber when the inertial masses are deflected
$d_{5min}$ Minimum radial arrangement diameter of spring units F5.1-F5.11
$d_{6max}$ Maximum radial arrangement diameter of spring units F6.1-F6.n
F5.1-F5.n Spring units of the damper 5
F6.1-F6.n Spring units of the damper 6
L Guide wheel
P Pump wheel
R Rotary axis
T Turbine wheel
T1-Tn Inertial masses

What is claimed is:

1. A damper unit comprising:
    a first damper including:
        first and second damper parts; and,
        a first spring engaged with the first and second damper parts;
    a second damper including:
        the second damper part;
        a third part separate from the first damper part; and,
        a second spring engaged with the second and third damper parts; and,
    a speed-adaptive absorber that is coupled between the first and second dampers, wherein:
        the second damper is radially inward of the first damper;
        the speed-adaptive absorber is directly connected to the second and third damper parts;
        the speed-adaptive absorber is displaceable with respect to the second and third damper parts; and,
        all of the speed-adaptive absorber is:
            axially located between the second and third damper parts; and
            axially aligned with the first and second dampers such that a line parallel to an axis of rotation for the damper unit passes through, in sequence, the second damper part, the speed-adaptive absorber, and the third damper part.

2. The damper unit recited in claim 1, wherein the speed-adaptive absorber is formed as a centrifugal pendulum-type absorber device comprising an inertial mass support device and at least two inertial masses mounted thereupon in an oscillating manner.

3. The damper unit recited in claim 2, wherein the inertial mass support device is created by an integral component in the form of a shaped sheet metal part forming a cover disk for the first damper or a flange of the second damper.

4. A force-transmitting device for transmitting power between a power input side and at least one power output side component, comprising an input and an output and an intermediately arranged hydrodynamic component, a shiftable clutch device to at least partially bridge the hydrodynamic component, and a damper unit, recited in claim 1, that are arranged and designed so that both the first and second dampers follow the shiftable clutch device in the flow of force viewed from the input to the output.

5. The force-transmitting device recited in claim 4, wherein the damper unit is coupled to the shiftable clutch device and the hydrodynamic component by a non-rotatable connection with axial length compensation.

6. The force-transmitting device recited in claim 4, wherein the damper unit is coupled to the shiftable clutch device or the hydrodynamic component by a non-rotatable connection with axial length compensation.

7. The damper unit recited in claim 1, wherein the speed-adaptive absorber is arranged in a radial direction between the respective spring units of the first and second dampers.

8. A damper unit comprising:
    an output hub;
    a first damper including:
        a first damper part;
        a first cover plate; and,
        a first spring engaged with the first damper part and the first cover plate;
    a second damper located radially inward of the first damper and including:

a second cover plate non-rotatably connected to the first cover plate;
the third cover plate non-rotatably connected to the second cover plate;
a flange non-rotatably connected to the hub; and,
a second spring engaged with the second and third cover plates and the flange; and,
a speed-adaptive absorber:
directly connected to the first, second, and third cover plates; and,
displaceable with respect to the first, second, and third cover plates.

9. A damper unit comprising:
an output hub;
a first damper including:
a first damper part;
a first cover plate; and,
a first spring engaged with the first damper part and the first cover plate;
a second damper located radially inward of the first damper and including:
a second cover plate non-rotatably connected to the first cover plate;
a third cover plate non-rotatably connected to the second cover plate;
a flange non-rotatably connected to the hub; and,
a second spring engaged with the second and third cover plates and the flange; and,
a speed-adaptive absorber:
directly connected to the first, second, and third cover plates; and,
displaceable with respect to the first, second, and third cover plates, wherein:
a line parallel to an axis of rotation for the damper unit passes through the first, second, and third cover plates and the speed-adaptive absorber; and,
the entirety of the speed-adaptive absorber is aligned with the second spring in a direction orthogonal to the axis of rotation.

* * * * *